Patented July 3, 1934

1,964,720

UNITED STATES PATENT OFFICE 1,964,720

HALOGEN-CONTAINING COMPOUND AND METHOD OF PREPARING SAME

Donald Drake Coffman, Wilmington, Del., assignor to E. I. du Pont de Nemours & Company, Wilmington, Del., a corporation of Delaware No Drawing. Application January 26, 1932, Serial No. 589,051

13 Claims. (Cl. 260—162)

This invention pertains to new and useful products and process for preparing same. More particularly the invention relates to the chlorination of dichloro-2,4-butene-2 and to novel chlorination products produced thereby.

A copending application of Carothers and Collins, Serial No. 409,538, filed October 22, 1930 discloses the preparation of certain new compounds by the addition of hydrogen chloride to monovinylacetylene. Included among these compounds is dichloro-2,4-butene-2, $CH_3—C(Cl)=CH—CH_2Cl$. The present invention deals with the chlorination of this compound and it embraces the novel products which are produced by the said chlorination.

It is an object of this invention to halogenate dihalogen-2,4-butene-2 with the production of new compounds. It is a more specific object to subject dichloro-2,4-butene-2 to chlorination under variable conditions to produce novel and valuable chloro derivatives in desired quantities.

According to the present invention dichloro-2,4-butene-2 either dissolved in an inert solvent such as carbon tetrachloride or not, is treated with chlorine at temperatures varying from considerably below normal room temperatures up to the boiling point of the compound. This is suitably done by passing gaseous chlorine into the compound, the conditions under which chlorination takes place being controlled according to the product which it is most desired to produce, the proportion of the various products differing considerably according to the particular conditions chosen.

The chlorination in this manner of dichloro-2,4-butene-2 leads to the formation of the following novel products:

Tetrachloro-2,2,3,4-butane,

Trichloro-2,3,4-butene-1,
and

Pentachloro-1,2,2,3,4-butane,

The various products are readily separated from one another by fractional distillation.

The following examples illustrate this process:

EXAMPLE 1

*Chlorination of dichloro-2,4-butene-2 at 0°–8° C.*

Into 250 g. (2 mole) of 2,4-dichlorobutene-2 dissolved in 500 cc. of dry carbon tetrachloride was passed dry chlorine, the temperature being maintained at 0°–8° C. After 120 g. of chlorine had been absorbed, the chlorination was stopped. In the process of chlorination a large amount of hydrogen chloride was evolved. The crude product in carbon tetrachloride was washed, dried, and fractionated in a precision still. Two fractions were thus obtained: One was trichloro-2,3,4-butene-1 (37 g. or 14% yield) which boiled at 65°–67° C. under 39 mm. pressure and had the refractivity

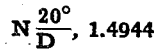

and the density

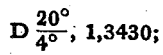

the other fraction was tetrachloro-2,2,3,4-butane (68 g. or 21% yield) which boiled at 90° C. under 32 mm. pressure and had the refractivity

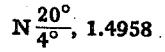

and the density

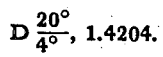

Simultaneously with the formation of the trichlorobutene and the tetrachlorobutene there is produced a substantial amount of pentachloro-1,2,2,3,4-butane boiling at 85° C./10 mm.

The following example illustrates the use of very low temperatures for producing a considerably larger yield of the trichlorobutene:

EXAMPLE 2

*Chlorination of dichloro-2,4-butene-2 at −50° C.*

Six moles (750 g.) of dichloro-2,4-butene-2, with or without a solvent such as carbon tetrachloride, are treated with chlorine at a temperature of about −50° C. with constant mechanical stirring, until an increase in weight amounting to about 300 g. is attained. This operation is attended by a copious evolution of HCl gas. The mixture is then allowed to warm up while a stream of air is passed through it to drive off the dissolved HCl. The mixture is then dried over a drying agent such as $MgSO_4$ and an alkaline agent such as $K_2CO_3$ and distilled.

The following example indicates an approach to the upper range of operative temperatures, and clearly illustrates the great difference in yields of the various products under different conditions and temperatures:

EXAMPLE 3

*Chlorination of dichloro-2,4-butene-2 at 45°–60° C.*

Two moles (250 g.) of dichloro-2,4-butene-2 are treated with chlorine at a temperature of 45°–60° C. with constant mechanical stirring, until an increase in weight of 86 g. is attained. The temperature is maintained between the said limits by occasional cooling of the flask. The weight of HCl evolved is approximately half of that evolved during chlorination of the same weight of dichloro-2,4-butene-3 at the temperature of solid carbon dioxide-acetone. The chlorination product is then dried over an alkaline agent such as $K_2CO_3$ and distilled. As in the preceding example, substantially three fractions are collected:

1. Trichloro-2,3,4-butene-1 at 37–41° C./10 mm. 28%
2. Tetrachloro-2,2,3,4-butane at 52–60° C/9 mm. 54%
3. Pentachloro-1,2,2,3,4-butane at 78–84° C/9 mm. 18%

From the above examples it will be noted that the yields of trichlorobutene are considerably improved by operating at lower temperatures, the yields of the tetrachloro and pentachloro compounds being varied accordingly in the manner indicated in the examples. Thus, the temperature conditions may be regulated according to the character of the chloro compound which it is desired to produce. At low temperatures large amounts of hydrogen chloride are evolved during the reaction; at higher temperatures very little hydrogen chloride is evolved and at those temperatures the tetrachloro compound is produced chiefly.

If the reaction is conducted in precisely the same way but at a temperature of 45°–60° C. very little hydrogen chloride is evolved and the principal product consists of tetrachlorobutane as already described above.

The preferred temperature range for the reaction may vary from —80° C. up to the boiling point of dichloro-2,4-butene-2.

Catalysts may be used to accelerate the chlorination reaction if desired. Typical catalysts are antimony pentachloride, cuprous chloride, cupric chloride, stannic chloride, ferric chloride, aluminum chloride, etc. The use of catalysts, however, frequently leads to the formation of by-products and makes the process of purification more difficult.

While no solvent is necessary, the optional use of carbon tetrachloride as a solvent has been mentioned. Other solvents having similar properties may, however, be substituted for carbon tetrachloride, e. g., toluene, carbon bisulfide, and chloroform.

The novel compounds described herein have a high degree of utility. For example, in a copending applicaton of Carothers and Berchet, Serial No. 589,052, filed January 26, 1932, there is described a method for treating trichloro-2,3,4-butene-1 with caustic to split off hydrogen chloride, the resulting chloro substituted butadiene being easily susceptible to polymerization to produce valuable compositions.

It will be understood that other halogen-2,4-butene-2 may be halogenated in a manner similar to that described for the chlorination of dichloro-2,4-butene-2 with production of related novel products.

The above description and examples are illustrative only and should not be construed as limiting the scope of the invention. Any modification or variation therefrom which conforms to the spirit of the invention is intended to be included within the scope of the claims.

I claim:

1. The process which comprises halogenating a dihalogen-2,4-butene-2.
2. The process which comprises halogenating a dihalogen-2,4-butene-2 in the presence of a solvent.
3. The process which comprises halogenating a dihalogen-2,4-butene-2 at a temperature varying from —80° C. to the boiling point of dihalogen-2,4-butene-2.
4. The process which comprises halogenating a dihalogen-2,4-butene-2 at a temperature approximately —50° C.
5. The process which comprises chlorinating dichloro-2,4-butene-2.
6. The process which comprises chlorinating dichloro-2,4-butene-2 in the presence of a solvent.
7. The process which comprises chlorinating dichloro-2,4-butene-2 at a temperature of from —80° C. to the boiling point of dichloro-2,4-butene-2.
8. The process which comprises chlorinating dichloro-2,4-butene-2 at a temperature approximately —50° C.
9. The process which comprises chlorinating dichloro-2,4-butene-2 in the presence of a chlorination catalyst.
10. As a new chemical compound, trihalogen-2,3,4-butene-1.
11. As a new chemical compound, tetrahalogen-2,2,3,4-butane.
12. As a new chemical compound, trichloro-2,3,4-butene-1.
13. As a new chemical compound, tetrachloro-2,2,3,4-butane.

DONALD D. COFFMAN.